US011455256B2

(12) United States Patent
Yokoyama et al.

(10) Patent No.: US 11,455,256 B2
(45) Date of Patent: Sep. 27, 2022

(54) MEMORY SYSTEM WITH FIRST CACHE FOR STORING UNCOMPRESSED LOOK-UP TABLE SEGMENTS AND SECOND CACHE FOR STORING COMPRESSED LOOK-UP TABLE SEGMENTS

(71) Applicant: KIOXIA CORPORATION, Tokyo (JP)

(72) Inventors: Tomonori Yokoyama, Kawasaki Kanagawa (JP); Mitsunori Tadokoro, Fujisawa Kanagawa (JP); Satoshi Kaburaki, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/806,234

(22) Filed: Mar. 2, 2020

(65) Prior Publication Data

US 2021/0081329 A1 Mar. 18, 2021

(30) Foreign Application Priority Data

Sep. 13, 2019 (JP) .............................. JP2019-166884

(51) Int. Cl.
*G06F 12/1045* (2016.01)
(52) U.S. Cl.
CPC .............................. *G06F 12/1045* (2013.01)
(58) Field of Classification Search
None
See application file for complete search history.

(56) References Cited

U.S. PATENT DOCUMENTS

| 6,523,102 | B1 * | 2/2003 | Dye ........................ G06F 12/08 711/170 |
| 6,779,088 | B1 * | 8/2004 | Benveniste ............. G06F 12/08 709/247 |
| 6,889,256 | B1 * | 5/2005 | Palevich ................. H04L 67/06 709/229 |
| 7,587,572 | B1 * | 9/2009 | Stenstrom ............... G06F 12/08 711/173 |
| 8,447,948 | B1 * | 5/2013 | Erdogan ............. G06F 12/0871 711/173 |
| 9,047,177 | B2 | 6/2015 | Matsudaira et al. |
| 9,378,131 | B2 | 6/2016 | Kurotsuchi et al. |
| 2001/0001872 | A1 * | 5/2001 | Singh .................. G06F 12/0802 711/129 |

(Continued)

*Primary Examiner* — Yaima Rigol
(74) *Attorney, Agent, or Firm* — Kim & Stewart LLP

(57) ABSTRACT

A memory system is connectable to the host. The memory system includes a nonvolatile first memory, a second memory in which a plurality of pieces of first information each correlating a logical address indicating a location in a logical address space of the memory system with a physical address indicating a location in the first memory are stored, a volatile third memory including a first cache and a second cache, a compressor configured to perform compression on the plurality of pieces of first information, and a memory controller. The memory controller stores the first information not compressed by the compressor in the first cache, stores the first information compressed by the compressor in the second cache, and controls a ratio between a first capacity, which is a capacity of the first cache, and a second capacity, which is a capacity of the second cache.

16 Claims, 10 Drawing Sheets

(56) References Cited

U.S. PATENT DOCUMENTS

| | | | |
|---|---|---|---|
| 2005/0015374 A1* | 1/2005 | Reinauer | G06F 12/0868 |
| 2007/0245097 A1* | 10/2007 | Gschwind | G06F 12/08 |
| | | | 711/154 |
| 2009/0112949 A1* | 4/2009 | Ergan | G06F 12/0802 |
| 2009/0228656 A1* | 9/2009 | Borkenhagen | G06F 12/0864 |
| | | | 711/118 |
| 2015/0301256 A1* | 10/2015 | Takiguchi | G02B 21/365 |
| | | | 359/9 |
| 2017/0177497 A1 | 6/2017 | Chun et al. | |
| 2017/0364446 A1* | 12/2017 | Pham | G06F 12/1009 |
| 2018/0173623 A1* | 6/2018 | Koob | G06F 12/12 |
| 2019/0222491 A1* | 7/2019 | Tomkins | H04L 41/5038 |
| 2019/0286570 A1* | 9/2019 | Miura | G06F 12/0864 |
| 2019/0391915 A1* | 12/2019 | Kim | G06F 3/0656 |
| 2020/0034298 A1* | 1/2020 | Benisty | G06F 12/1009 |

\* cited by examiner

MEMORY SYSTEM WITH FIRST CACHE FOR STORING UNCOMPRESSED LOOK-UP TABLE SEGMENTS AND SECOND CACHE FOR STORING COMPRESSED LOOK-UP TABLE SEGMENTS

CROSS-REFERENCE TO RELATED APPLICATION(S)

This application is based upon and claims the benefit of priority from Japanese Patent Application No. 2019-166884, filed Sep. 13, 2019, the entire contents of which are incorporated herein by reference.

FIELD

Embodiments described herein relate generally to a memory system.

BACKGROUND

A memory system including a nonvolatile memory as a storage memory is known. The nonvolatile memory is, for example, a NAND flash memory.

The memory system stores a group of address translation information in a nonvolatile memory. Each address translation information is information for correlating a logical address indicating a location in a logical address space with a physical address indicating a location in the nonvolatile memory.

Whenever a certain logical address is translated into a physical address, the memory system needs the address translation information for correlating the logical address with the physical address. However, since an access speed to the nonvolatile memory is not so fast, time required for address translation operation increases if the address translation information is acquired from the nonvolatile memory. Therefore, in order to obtain the address translation information at a higher speed, the memory system is provided with a cache memory in which a part of a group of the address translation information is stored as cache data.

DETAILED DESCRIPTION

Embodiments provide a memory system with a high performance.

In general, according to one embodiment, the memory system is connectable to the host. The memory system includes a nonvolatile first memory, a second memory in which a plurality of pieces of first information each correlating a logical address indicating a location in a logical address space of the memory system with a physical address indicating a location in the first memory are stored, a volatile third memory including a first cache and a second cache, a compressor configured to perform compression on the plurality of pieces of first information, and a memory controller. The memory controller stores the first information not compressed by the compressor in the first cache, stores the first information compressed by the compressor in the second cache, and controls a ratio between a first capacity, which is a capacity of the first cache, and a second capacity, which is a capacity of the second cache.

Hereinafter, memory systems according to embodiments will be described in detail with reference to the accompanying drawings. The present disclosure is not limited to the embodiments.

First Embodiment

Figure 1:
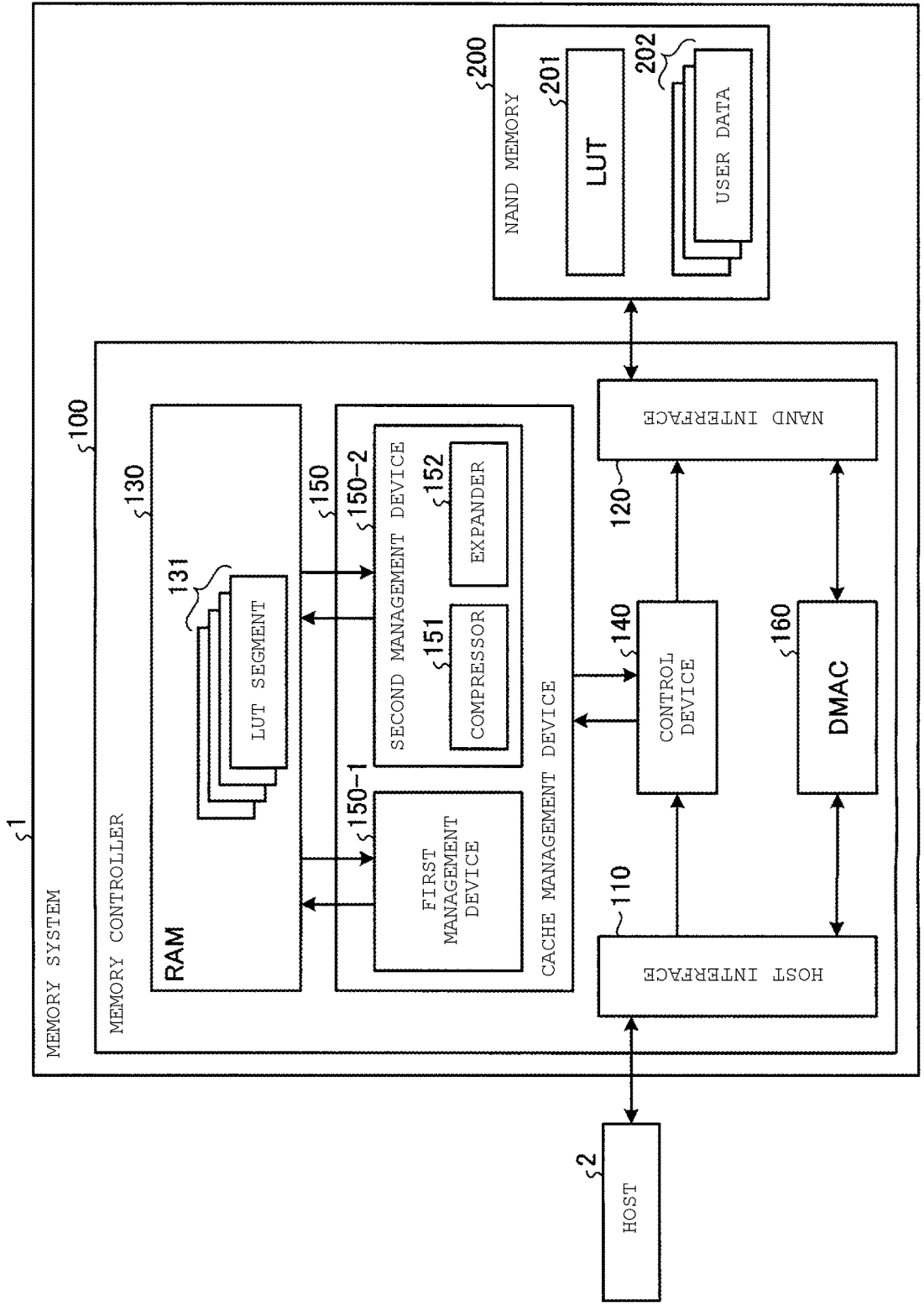
FIG. 1 is a schematic diagram illustrating an example of a configuration of a memory system according to a first embodiment.

FIG. 1 is a schematic diagram illustrating an example of a configuration of a memory system according to a first embodiment. The memory system 1 is connected to a host 2. A connection standard for the connection between the memory system 1 and the host 2 is not limited to any one specific standard. The host 2 is, for example, a personal computer, a portable information terminal, or a server.

The host 2 transmits an access command (e.g., a read command or a write command) to the memory system 1 when accessing the memory system 1. Each access command is accompanied by a logical address. The logical address is information indicating a location in a logical address space provided by the memory system 1 to the host 2.

The host 2 transmits write target data together with the write command. The write target data that is transmitted together with the write command is referred to as user data.

The memory system 1 includes a memory controller 100 and a NAND flash memory (NAND memory) 200.

The NAND memory 200 is a nonvolatile memory and is an example of a first memory. Any type of the nonvolatile memory may be adopted as the first memory. The NAND memory 200 is also an example of a second memory in which an LUT 201 described below is stored. The memory system 1 may have the second memory separately from the NAND memory 200 as the first memory. The second memory is not limited to a specific type of memory.

The NAND memory 200 includes a memory cell array having a plurality of blocks. Data stored in each block is erased collectively. Each block includes a plurality of pages. Writing data to the memory cell array and reading data from the memory cell array are performed page by page.

The NAND memory 200 stores a lookup table (LUT) 201 and user data 202.

The LUT 201 is a group of address translation information that associates a logical address with a physical address indicating a location in the NAND memory 200. The LUT 201 has a data structure in which physical addresses corresponding to each logical address are arranged in an order of the logical addresses. The data structure of the group of address translation information is not limited to this example.

The memory controller 100 includes a host interface 110, a NAND interface 120, a random access memory (RAM) 130, a control device 140, a cache management device 150, and a direct memory access controller (DMAC) 160.

Some or all of elements in the memory controller 100 may be implemented by a hardware circuit that operates based on a computer program, such as a central processing unit (CPU). Further, some or all of the elements in the memory controller 100 may be implemented by a hardware circuit such as a field-programmable gate array (FPGA) or an application specific integrated circuit (ASIC). That is, the memory controller 100 may be implemented by hardware, software, or a combination thereof. The memory controller 100 may be implemented as a system-on-a-chip (SoC) or the memory controller 100 may be implemented by a plurality of chips. For example, the cache management device 150, including the first management device 150-1 and the second management device 150-2, may be implemented in hardware as a circuit or as a programmed processor. Further, a compressor 151 and an expander 152, which are components of the second management device 150-2, may implemented in hardware as a circuit or as a programmed processor.

The RAM 130 is a set associative cache memory and is an example of a third memory. The RAM 130 is implemented by a type of memory that can be accessed at a higher speed than the NAND memory 200. The RAM 130 is typically volatile memory but may be a nonvolatile memory. The RAM 130 is implemented by, for example, a dynamic random access memory (DRAM) or a static random access memory (SRAM). The type of memory of the RAM 130 is not limited to the type of memory described above.

Figure 2:
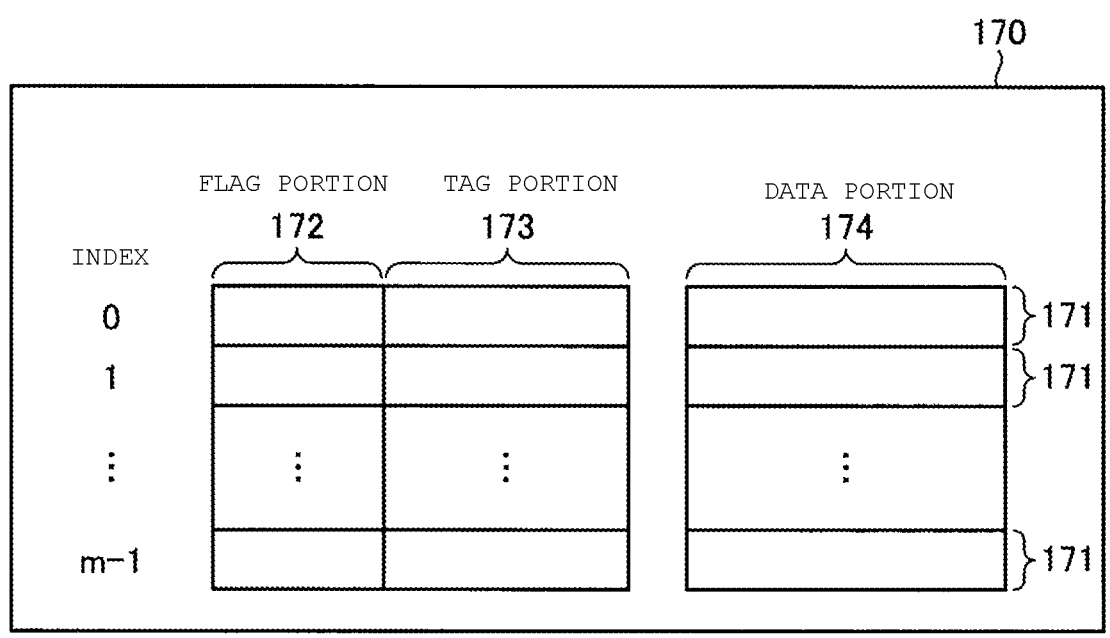
FIG. 2 is a schematic diagram illustrating an example configuration of a cache memory.

FIG. 2 is a schematic diagram illustrating one configuration of the RAM 130 according to the first embodiment. In the example of this figure, the configuration of the RAM 130 includes m cache lines 171, where m is a positive integer.

Each of the m cache lines 171 is given a serial number called an index. The top cache line 171 is given number 0 as the index. When m is 2 or greater, each index of the cache line 171 other than the top cache line 171 is given any value of a range from 1 to (m−1), which indicates a relative location from the top cache line 171.

Each cache line 171 includes a flag portion 172, a tag portion 173, and a data portion 174. As long as the flag portion 172 and the tag portion 173 are correlated with the data portion 174 on a one-to-one basis, the flag portion 172, the tag portion 173, and the data portion 174 may be arranged at different locations in the RAM 130. The flag portion 172 and the tag portion 173 may be arranged outside the RAM 130. The flag portion 172 and the tag portion 173 may be described as management information.

The data portion 174 stores a LUT segment 131. The LUT segment 131 is data generated by duplicating a part of the LUT 201. Each LUT segment 131 includes address translation information for consecutive logical addresses, the number of which is predetermined. That is, each LUT segment 131 has a data structure in which physical addresses corresponding to each of a predetermined number of consecutive logical addresses are arranged in the order of logical addresses.

The tag portion 173 stores information called a tag. The flag portion 172 stores one or more pieces of flag information used for controlling the cache line 171.

The flag information includes, for example, a flag indicating whether or not the information stored in the data portion 174 is valid, a flag indicating whether or not the information stored in the data portion 174 is dirty, or the like. Examples of flag information are not limited to these.

Each of the plurality of configurations in the RAM 130 has the configuration illustrated in FIG. 2.

Recently, a memory system having very large user capacity has been developed. If the user capacity increases, a maximum value of the logical address also increases. When an LUT entry is generated for each constant logical address, if the maximum value of the logical address increases with an increase in the user capacity, a required total size of the LUT increases in proportion to the user capacity. Meanwhile, in a memory system with a large user capacity, when trying to achieve a cache hit rate equivalent to a cache hit rate of a memory system with a small user capacity, a cache memory having a size in accordance with the total size of the LUT is required. However, a cost of the cache memory increases as the size of the cache memory increases.

Therefore, in the first embodiment, the memory controller 100 is configured to be able to compress the LUT segment 131 to store in the RAM 130 in order to save the cache memory capacity while preventing a decrease in the cache hit rate. If the LUT segment 131 is compressed, a size of the cache line 171 required for one LUT segment 131 can be reduced, and thereby, the number of cache lines that are allocated to the cache memory having the same capacity can be increased as compared with a case where the LUT segment 131 is not compressed, and thus, an improvement in the cache hit rate is expected.

Here, a compression algorithm of the LUT segment 131 is required to perform lossless compression. However, with lossless compression, a compression rate cannot be guaranteed. That is, the compression rate can change for each LUT segment 131. In the present specification, it is assumed that the compression rate refers to a ratio between a size of uncompressed data and a size of compressed data, and a high compression rate signifies that the size of the compressed data is smaller than a low compression rate.

Further, if the LUT segment 131 is compressed, it is necessary to perform processing of expanding the LUT segment 131 read from the cache line when a cache hit occurs to restore the LUT segment 131 to a state before compression.

Thus, in case of an LUT that cannot obtain a high compression rate, demerit of requiring time for expansion processing is greater than merit obtained by compressing the LUT, that is, merit of saving a capacity of the cache memory. When the LUT segment 131 that cannot obtain a high compression rate is not compressed, access performance of the memory system 1 can be improved as compared with a case where all the LUT segments 131 stored in the RAM 130 are compressed.

Therefore, in the first embodiment, a non-compression LUT cache 180-1 in which an uncompressed LUT segment 131 is stored and a compression LUT cache 180-2 in which a compressed LUT segment is stored are allocated in the RAM 130. The non-compression LUT cache 180-1 is an example of a first cache. The compression LUT cache 180-2 is an example of a second cache.

Figure 3:
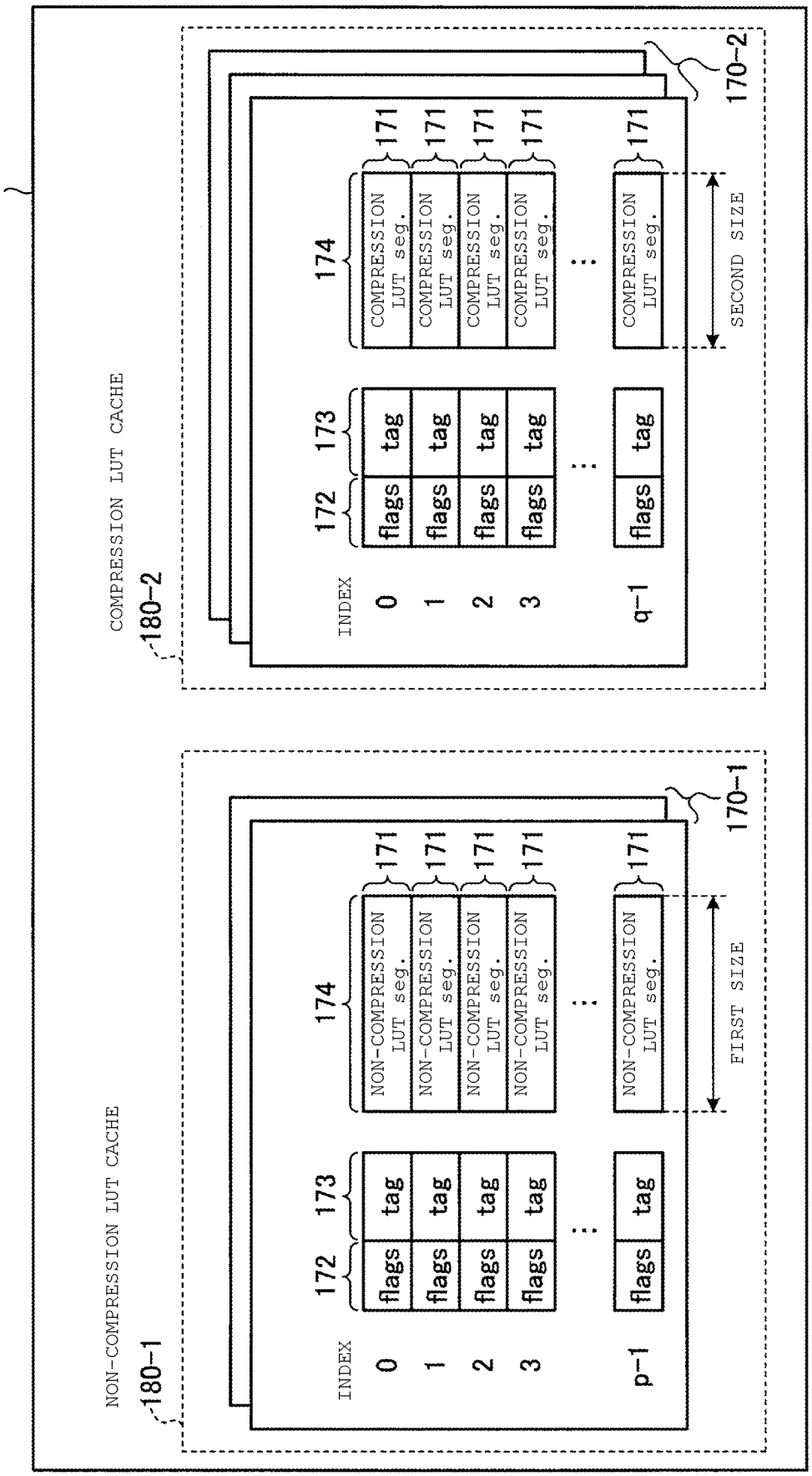
FIG. 3 is a schematic diagram illustrating an example configuration of the cache memory, according to the first embodiment.

FIG. 3 is a schematic diagram illustrating an example of a configuration of the RAM 130. In the example of this figure, the non-compression LUT cache 180-1 includes two tables 170-1, and the compression LUT cache 180-2 includes three tables 170-2. An uncompressed LUT segment 131 is stored in the non-compression LUT cache 180-1. A compressed LUT segment 131 is stored in the compression LUT cache 180-2.

Each table 170-1 includes p cache lines 171. Each table 170-2 includes q cache lines 171. p and q are positive integers. p and q may be different from each other.

Sizes of all data portions 174 in each table 170-1 are unified to have a predetermined size (depicted in FIG. 3 as a first size). Further, all data portions 174 in each table 170-2 are unified to have a predetermined size (depicted in FIG. 3 as a second size) smaller than the first size. According to this, the LUT segment 131 whose size is smaller than or equal to the second size after compression can be stored in any data portion 174 of any table 170-2.

Hereinafter, a group of tables 170-1 for the uncompressed LUT segment 131 may be referred to as a non-compression LUT cache 180-1. A group of tables 170-2 for the compressed LUT segment 131 may be referred to as a compression LUT cache 180-2.

A compression rate changes according to an entropy of information to be compressed. The lower the entropy of the information to be compressed is, the smaller the size of the compressed data.

When the LUT segment 131 is compressed, the lower the entropy of a plurality of physical addresses in the LUT segment 131, the smaller the size of the compressed data. The entropy of a plurality of physical addresses in the LUT segment 131 can change according to a data write pattern that causes the LUT segment 131 to be generated. That is, a compression rate of the LUT segment 131 can change according to the data write pattern from the host 2.

For example, when the host 2 accesses the memory system in a sequential write pattern, a series of user data transmitted from the host 2 is written to a consecutive region in the NAND memory 200. Accordingly, the LUT segment 131 generated according to write of a series of user data includes a portion that linearly correlates a plurality of consecutive physical addresses with a plurality of consecutive logical addresses. Such an LUT segment 131 has a low entropy. Thus, such LUT segment 131 can be compressed into data of a small size.

That is, the higher the frequency of sequential writes, the higher the compression rate of the LUT segment 131.

When the host 2 accesses the memory system 1 in a random write pattern, a series of user data with poor continuity of logical addresses is written to a consecutive region in the NAND memory 200, contrary to a case of the sequential writes.

Thus, if random write is performed at a high frequency, continuity of a plurality of physical addresses correlated with a plurality of consecutive logical addresses is decreased, and the entropy of the generated LUT segment 131 increases. According to this, a compression rate of the LUT segment 131 is decreased more than in a case of the sequential writes.

In the first embodiment, a ratio between a capacity of the non-compression LUT cache 180-1 and a capacity of the compression LUT cache 180-2 is controlled according to a frequency of the sequential writes. When the frequency of sequential writes is high, it is estimated that the LUT segment 131 is likely to be compressed to a small size, and thereby, a capacity ratio of the compression LUT cache 180-2 to the non-compression LUT cache 180-1 is to be increased. When the frequency of sequential writes is low, it is estimated that the LUT segment 131 is less likely to be compressed to a small size, and thereby, the capacity ratio of the non-compression LUT cache 180-1 to the compression LUT cache 180-2 is to be increased. A more detailed description on this control will be described below.

Description returns to FIG. 1.

The host interface 110 is an interface device on the memory controller 100 side for performing transmission and reception of the command and the user data 202 between the host 2 and the memory controller 100. The NAND interface 120 is an interface device for performing an access to the NAND memory 200.

The control device 140 comprehensively controls an operation of the memory controller 100. Particularly, the control device 140 receives a command from the host 2 via the host interface 110 and analyzes the received command. The control device 140 instructs the NAND interface 120 to operate the NAND memory 200 in accordance with the analysis result. For example, when receiving an access command from the host 2, the control device 140 instructs the NAND interface 120 to perform an access corresponding to the access command with respect to the NAND memory 200.

When the received access command is a write command, the control device 140 determines whether or not the write pattern by the write command corresponds to the sequential writes. The control device 140 calculates the frequency of sequential writes based on the result of the determination.

The control device 140 controls a ratio between the capacity of the non-compression LUT cache 180-1 and the capacity of the compression LUT cache 180-2 according to the frequency of sequential writes.

A method of calculating the frequency of sequential writes may be freely chosen. An example of the method of calculating the frequency of sequential writes and a method of controlling the ratio between the capacity of the non-compression LUT cache 180-1 and the capacity of the compression LUT cache 180-2 will be described below.

When the received access command is a read command, the control device 140 translates the logical address into a physical address with reference to address translation information on the logical address designated by the read command. When the user data 202 is written to the NAND memory 200, the control device 140 updates the address translation information relating to the user data 202.

The control device 140 can use the LUT segment 131 including the address translation information to be referenced or to be updated by transmitting the logical address to the cache management device 150.

The cache management device 150 includes a first management device 150-1 and a second management device 150-2. The first management device 150-1 manages the non-compression LUT cache 180-1. The second management device 150-2 manages the compression LUT cache 180-2.

The second management device 150-2 includes the compressor 151 that can compress the LUT segment 131, and the expander 152 that can expand the compressed LUT segment 131.

When the cache management device 150 receives a logical address from the control device 140, first, the first management device 150-1 performs a search for the non-compression LUT cache 180-1.

Specifically, the first management device 150-1 first acquires a tag and an index from a bit string of the logical address received from the control device 140. The first management device 150-1 reads the tag from the tag portion 173 of the cache line 171, which is indicated by the acquired index, of each table 170-1 for the uncompressed LUT segment 131. The first management device 150-1 compares the tag obtained from each table 170-1 with the tag acquired from the logical address.

When any of the tags obtained from all the tables 170-1 matches the tag obtained from the logical address, that is, when the search result is a cache hit, the first management device 150-1 makes the control device 140 use the LUT segment 131, which is stored in the data portion 174, of the cache line 171 from which a tag matching the tag acquired from the logical address is read.

When there is no tag that matches the tag acquired from the logical address among the tags obtained from all the tables 170-1, that is, when the search result is a cache miss, the second management device 150-2 searches the compression LUT cache 180-2.

First, the second management device 150-2 acquires a tag and an index from the bit string of the logical address received from the control device 140. When the number p+1 of indices in the table 170-1 is equal to the number q+1 of indices in the table 170-2, the second management device 150-2 may use the tag and index acquired from the logical address by the first management device 150-1.

The second management device 150-2 reads the tag from the tag portion 173 of the cache line 171, which is indicated by the acquired index, of each table 170-2 for the compressed LUT segment 131. Like the first management device 150-1, the second management device 150-2 determines whether the search result is a cache hit or a cache miss by comparing the tag obtained from each table 170-2 with the tag acquired from the logical address.

When the search result is a cache hit, the second management device 150-2 reads the compressed LUT segment 131 of the cache line 171 from which a tag that matches the tag acquired from the logical address is read, from the data portion 174. The read LUT segment 131 is expanded by the expander 152, and the second management device 150-2 makes the control device 140 use the LUT segment 131 restored to the uncompressed state by the expansion.

In the first embodiment, as an example, the LUT segment 131 restored by the expansion is once stored in the non-compression LUT cache 180-1, and the control device 140 uses the LUT segment 131 stored in the non-compression LUT cache 180-1. Alternatively, the restored LUT segment 131 may not be stored in the non-compression LUT cache 180-1.

When the search results obtained by the first management device 150-1 and the second management device 150-2 are both cache misses, the cache management device 150 performs refilling.

The refilling is processing of reading the LUT segment 131 including address translation information for correlating a target logical address with a physical address from the LUT 201 stored in the NAND memory 200 and storing the read LUT segment 131 in any of the tables 170-1 or 170-2.

In the first embodiment, at the time of refilling, the LUT segment 131 read from the NAND memory 200 is stored in the non-compression LUT cache 180-1. After performing the refill, the cache management device 150 makes the control device 140 use the LUT segment 131 stored in the non-compression LUT cache 180-1 by the refilling.

In the refilling, the table 170-1 in which the LUT segment 131 read from the NAND memory 200 is written is determined by a freely selected method. The table 170-1 in which the LUT segment 131 read from the NAND memory 200 is written can be determined by a method such as least recently used (LRU) or round robin.

Among the determined tables 170-1, the cache line 171-1 indicated by the index acquired from the bit string of the logical address received from the control device 140 is set as the write destination cache line 171-1.

When the write destination cache line 171-1 is dirty, the first management device 150-1 extracts the LUT segment 131 from the data portion 174 of the dirty cache line 171-1 and moves to the NAND memory 200. This processing is also referred to as write-back.

Due to the write-back, the cache line 171-1 of a write destination which is in a dirty state is shifted to a clean state. After the cache line 171 of the write destination is shifted to the clean state, the first management device 150-1 can write the LUT segment 131 read from the NAND memory 200 in the cache line 171-1.

In the first embodiment, the first management device 150-1 extracts the LUT segment 131 which is a write-back target and moves to the NAND memory 200 and also sends the LUT segment 131 to the second management device 150-2.

The second management device 150-2 uses the compressor 151 to compress the LUT segment 131 sent from the first management device 150-1. Then, the second management device 150-2 determines whether or not a size of the compressed LUT segment 131 is smaller than or equal to the second size.

When the size of the compressed LUT segment 131 is smaller than or equal to the second size, the second management device 150-2 writes the compressed LUT segment 131 in the compression LUT cache 180-2. The write destination table 170-2 and the cache line 171 are determined by a freely selected method as in a case of the non-compression LUT cache 180-1.

When the size of the compressed LUT segment 131 exceeds the second size, the second management device 150-2 discards the compressed LUT segment 131 without writing it to the compression LUT cache 180-2.

The DMAC 160 is a device that transfers the user data 202 between the host interface 110 and the NAND interface 120. The DMAC 160 transfers the user data 202 by using a direct memory access (DMA) method.

Subsequently, an operation of the memory system 1 according to the embodiment will be described.

Figure 4:
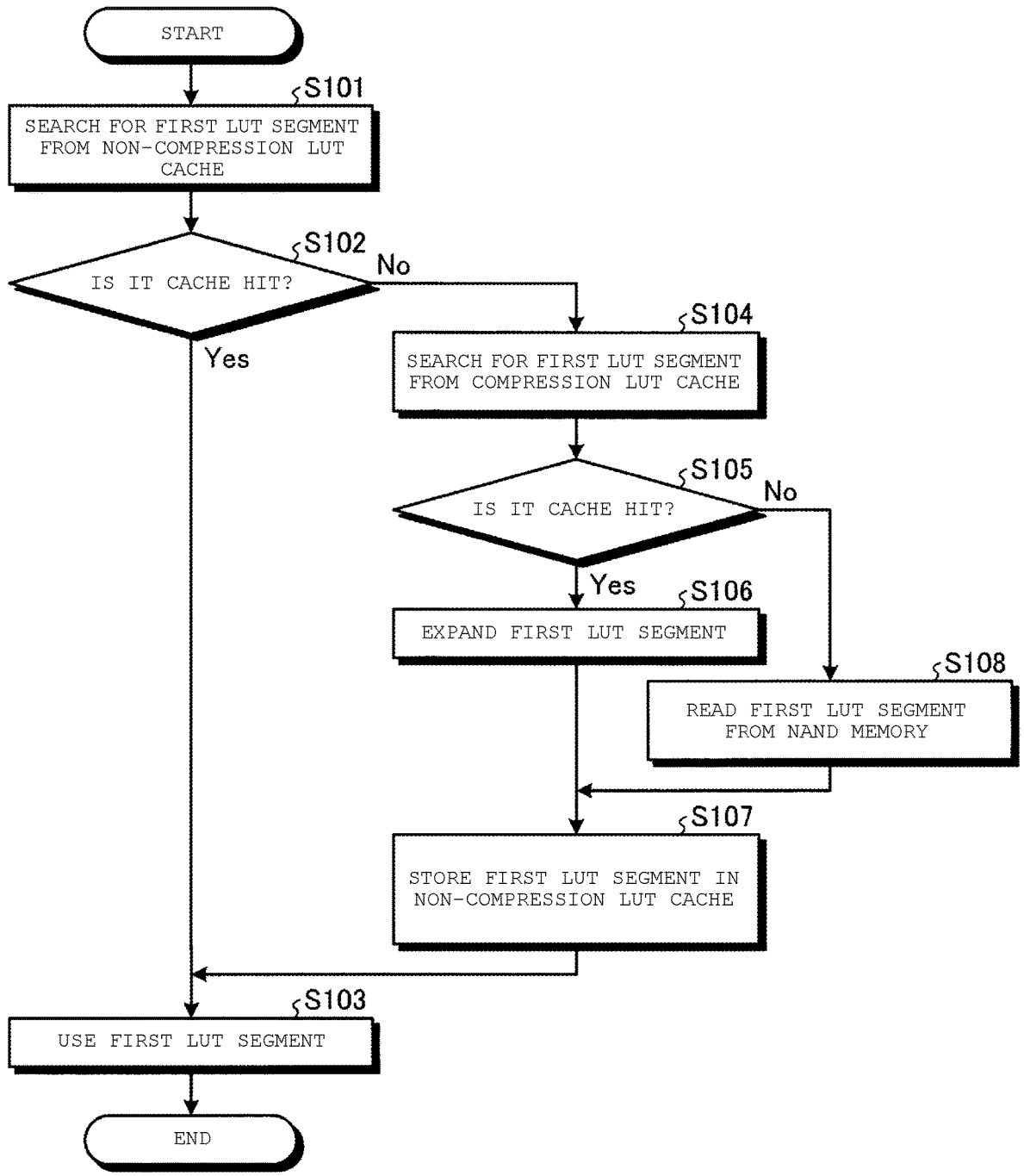
FIG. 4 is a flowchart illustrating an example of an operation for searching a cache, which is performed by the memory system according to the first embodiment.

FIG. 4 is a flowchart illustrating an example of a search operation for searching the cache (that is, the non-compression LUT cache 180-1 and the compression LUT cache 180-2), which is performed by the memory system 1 according to the first embodiment. The processing in FIG. 4 starts when the control device 140 transmits a logical address to the cache management device 150. The logical address transmitted from the control device 140 to the cache management device 150 is referred to as a target logical address. Further, the LUT segment 131 including address translation information for correlating the target logical address with a physical address is referred to as a first LUT segment 131.

First, the first management device 150-1 searches for the first LUT segment 131 from the non-compression LUT cache 180-1 (S101). When the search result in S101 is a cache hit (S102: Yes), the control device 140 uses the first LUT segment 131 stored in the non-compression LUT cache 180-1 (S103). The use means reference or updating. An operation of searching the cache ends after S103.

When the search result in S101 is not the cache hit (S102: No), the second management device 150-2 searches for the first LUT segment 131 from the compression LUT cache 180-2 (S104). When the search result in S104 is the cache hit (S105: Yes), the second management device 150-2 reads the compressed first LUT segment 131 from the compression LUT cache 180-2 and expands the compressed first LUT segment 131 by using the expander 152 (S106).

The second management device 150-2 sends the first LUT segment 131 restored by expansion to the first management device 150-1, and the first management device 150-1 stores the first LUT segment 131 in the non-compression LUT cache 180-1 (S107). Then, the control proceeds to S103.

When the search result in S104 is not the cache hit (S105: No), the cache management device 150 reads the first LUT segment 131 from the NAND memory 200 via the NAND interface 120 (S108). Then, the control proceeds to S107, and the first LUT segment 131 read from the NAND memory 200 is stored in the non-compression LUT cache 180-1.

In the processing of S107, when the cache line 171 of a storage destination is dirty, the content of the cache line 171 of the storage destination is extracted and moved. A detailed operation of the processing of S107 including the extraction and movement will be described.

Figure 5:
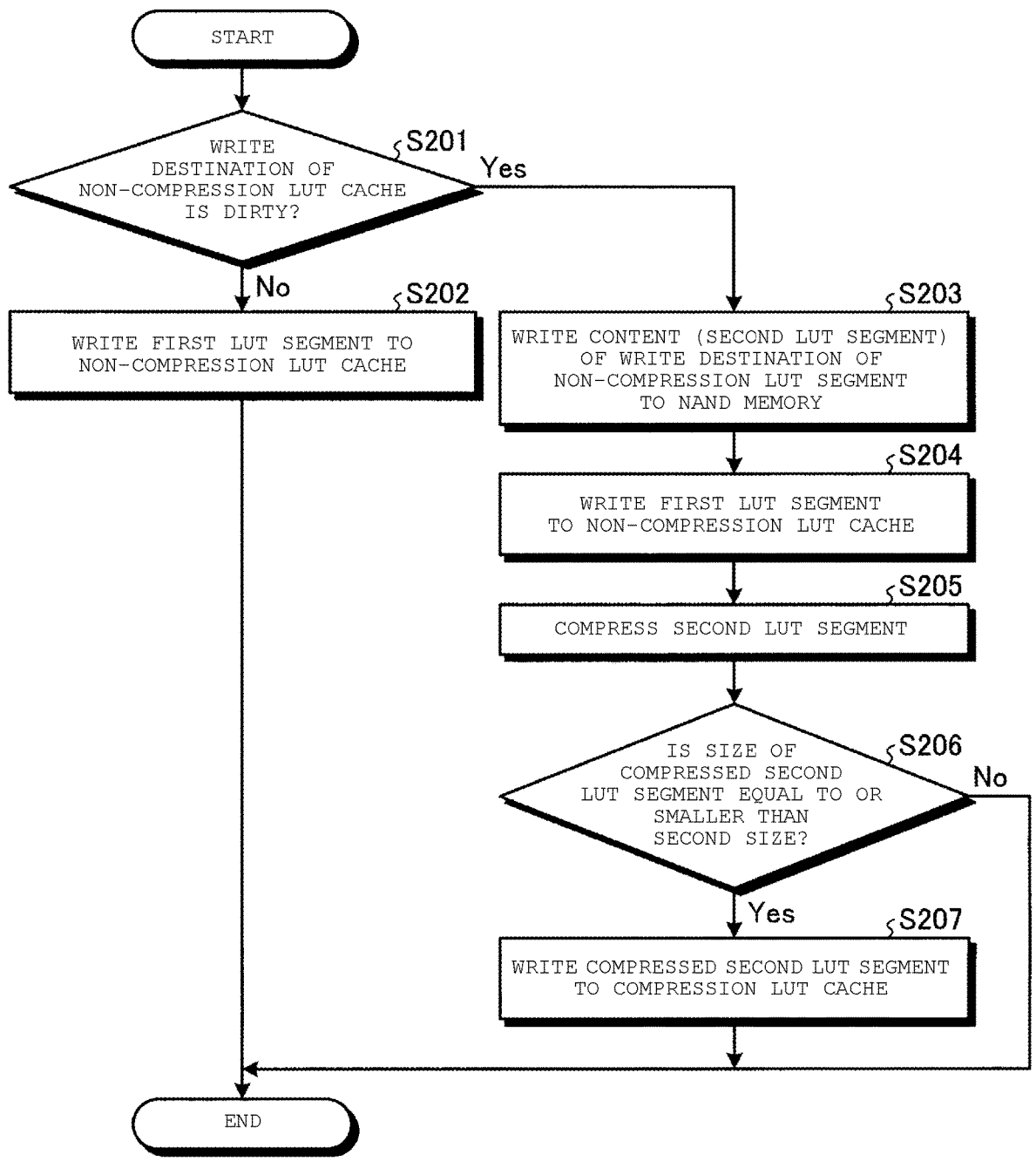
FIG. 5 is a flowchart illustrating an example of detailed processing of a step in FIG. 4.

FIG. 5 is a flowchart illustrating an example of a detailed operation of storing the first LUT segment 131 in the non-compression LUT cache 180-1, that is, processing of S107, which is performed by the memory system 1 according to the first embodiment.

First, the first management device 150-1 determines whether or not the cache line 171-1 of a write destination of the first LUT segment 131 in the non-compression LUT cache 180-1 is dirty (S201). Whether or not the cache line 171-1 is dirty may be determined based on, for example, flag information stored in the flag portion 172.

If the cache line 171-1 is not dirty (S201: No), the first management device 150-1 writes the first LUT segment 131 to the cache line 171-1 (S202). Then, the processing of S107 ends.

When the cache line 171-1 is dirty (S201: Yes), the first management device 150-1 stores content of the cache line 171-1 (denoted as the second LUT segment 131) in the NAND memory 200 via the NAND interface 120 (S203). This processing corresponds to the write-back. After performing the write-back, the first management device 150-1 performs write of the first LUT segment 131 to the non-compression LUT cache 180-1 (S204).

The first management device 150-1 performs write-back of the second LUT segment 131 and sends the second LUT segment 131 to the second management device 150-2. The second management device 150-2 compresses the second LUT segment 131 by using the compressor 151 (S205) and determines whether or not a size of the compressed second LUT segment 131 is smaller than or equal to the second size (S206).

When the size of the compressed second LUT segment 131 is smaller than or equal to the second size (S206: Yes), the second management device 150-2 writes the compressed second LUT segment 131 to a certain cache line 171 of the compression LUT cache 180-2 (S207). Then, the processing of S107 ends.

When the size of the compressed second LUT segment 131 is not smaller than or equal to the second size (S206: No), the processing of S207 is skipped, and the processing of S107 ends.

Figure 6:
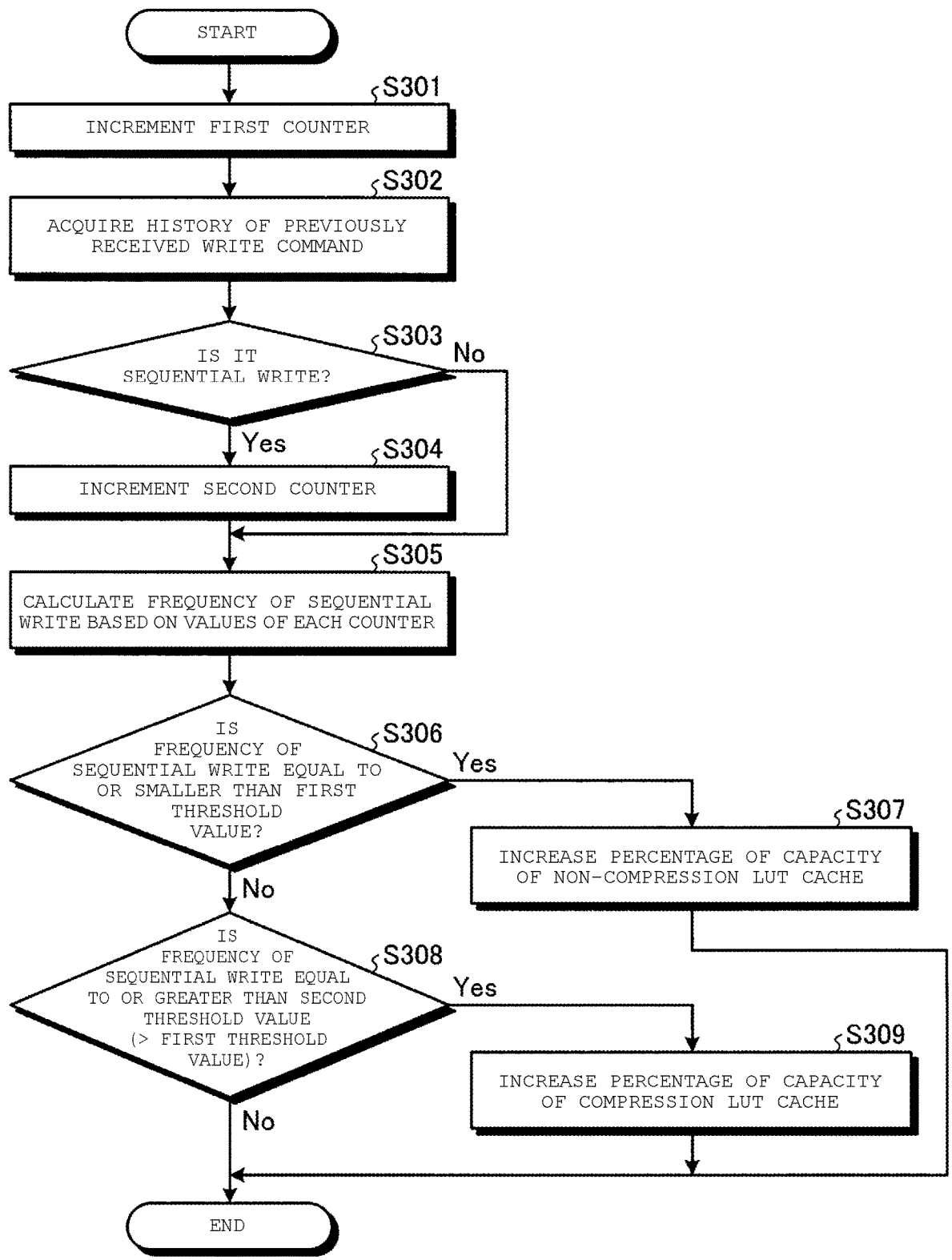
FIG. 6 is a flowchart illustrating an example of an operation performed by the memory system according to the first embodiment, for controlling a ratio between a capacity of the non-compression LUT cache and a capacity of a compression LUT cache.

FIG. 6 is a flowchart illustrating an example of an operation of controlling a ratio between the capacity of the non-compression LUT cache 180-1 and the capacity of the compression LUT cache 180-2, which is performed by the memory system 1 according to the first embodiment.

If a write command is received, the control device 140 increments a first counter indicating the number of received write commands (S301). The first counter is allocated to, for example, a small memory or register disposed in the control device 140 or near the control device 140. The location of the first counter is not limited to this.

Subsequently, the control device 140 acquires history of a previously received (e.g., immediately preceding) write command (S302). The control device 140 records the previously received write command in, for example, a small memory or register disposed in the control device 140 or near the control device 140. The control device 140 reads the previously received write command from the small memory or register. The storage device in which the previously received write command is stored is not limited to this.

Subsequently, the control device 140 determines whether or not a pattern of data write due to the currently received write command corresponds to a sequential write, based on the currently received write command and the previously received write command (S303).

For example, the control device 140 determines whether or not a logical address range in which user data is written by the currently received write command follows a logical address range in which the user data is written by the previously received write command. When the logical address range to which the user data is written by the currently received write command follows the logical address range to which the user data is written by the previously received write command, the control device 140 may determine that the pattern of data write due to currently received write command corresponds to sequential write. When the logical address range to which the user data is written by the currently received write command does not follow the logical address range to which the user data is written by the previously received write command, the control device 140 may determine that the pattern of data write due to the currently received write command does not correspond to the sequential write.

A method of determining whether or not the pattern of data write due to the currently received write command corresponds to the sequential write is not limited to the above-described method.

When it is determined that the pattern of data write due to the currently received write command corresponds to the sequential write (S303: Yes), the control device 140 increments a second counter indicating the number of data writes corresponding to sequential write (S304). The second counter is allocated to, for example, a small memory or register disposed in the control device 140 or near the control device 140. The location of the second counter is not limited to this.

When it is determined that the pattern of data write due to the currently received write command does not correspond to the sequential write (S303: No), the processing of S304 is skipped.

After the processing of S303 or S304, the control device 140 calculates a frequency of the sequential writes based on values of the first and second counters (S305). The frequency of the sequential writes is obtained, for example, by dividing the value of the second counter by the value of the first counter. The method of calculating the frequency of the sequential writes is not limited to this.

Subsequently, the control device 140 determines whether or not the frequency of the sequential writing is smaller than or equal to a preset first threshold value (S306). When the frequency of the sequential writes is smaller than or equal to the first threshold value (S306: Yes), the control device 140 increases a percentage of capacity of the non-compression LUT cache 180-1 (S307).

When the frequency of the sequential writes is not smaller than or equal to the first threshold value (S306: No), the control device 140 determines whether or not the frequency of the sequential writes is greater than or equal to a preset second threshold value (S308). Here, there is a relationship that the first threshold value is less than the second threshold value.

When the frequency of the sequential write is greater than or equal to the second threshold value (S308: Yes), the control device 140 increases the percentage of capacity of the compression LUT cache 180-2 (S309).

When the frequency of the sequential write is not greater than or equal to the second threshold value (S308: No), or after the processing of S307 or after the processing of S309, the operation for controlling a ratio between the capacity of the non-compression LUT cache 180-1 and the capacity of the compression LUT cache 180-2 ends.

Figure 7:
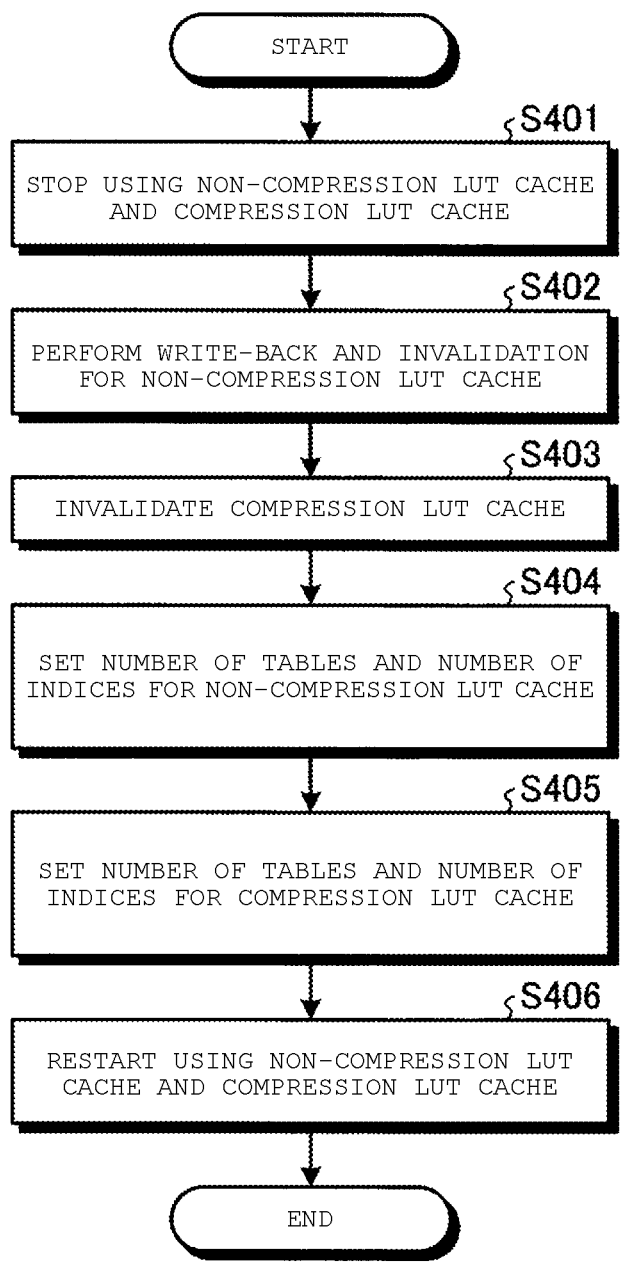
FIG. 7 is a flowchart illustrating an example of a specific operation performed by the memory system according to the first embodiment when changing the ratio between the capacity of the non-compression LUT cache and the capacity of the compression LUT cache.

FIG. 7 is a flowchart illustrating an example of a specific operation performed by the memory system 1 according to the first embodiment when changing a ratio between the capacity of the non-compression LUT cache 180-1 and the capacity of the compression LUT cache 180-2.

First, the cache management device 150 stops using the non-compression LUT cache 180-1 and the compression LUT cache 180-2 (S401).

Subsequently, the first management device 150-1 performs write-back for all the cache lines 171 in a dirty state among all the tables 170-1 in the non-compression LUT cache 180-1, and thereafter invalidates the non-compression LUT cache 180-1 (S402).

Processing of invalidation in S402 is not limited to the specific processing described herein. For example, the first management device 150-1 includes first cache management information (not illustrated) for defining the number of tables 170-1, the number of indices, and allocation of the non-compression LUT cache 180-1. The first cache management information includes a valid bit indicating whether or not content of the first cache management information is valid. The first management device 150-1 invalidates the non-compression LUT cache 180-1 by clearing the valid bit in the first cache management information.

Subsequently, the second management device 150-2 invalidates the compression LUT cache 180-2 (S403).

Processing of invalidation in S403 is not limited to the specific processing described herein. For example, the second management device 150-2 includes second cache management information (not illustrated) for defining the number of tables 170-2, the number of indices, and allocation of the compression LUT cache 180-2. The second cache management information includes a valid bit indicating whether or not content of the second cache management information is valid. The second management device 150-2 invalidates the compression LUT cache 180-2 by clearing the valid bit in the second cache management information.

Subsequently, the control device 140 sets the number of tables 170-1 constituting the non-compression LUT cache 180-1 and the number of indices in each table 170-1 (S404). The first management device 150-1 configures the non-compression LUT cache 180-1 in the RAM 130 according to the setting content by the processing of S404.

Subsequently, the control device 140 sets the number of tables 170-2 configured in the compression LUT cache 180-2 and the number of indices in each table 170-2 (S405). The second management device 150-2 configures the compression LUT cache 180-2 in the RAM 130 according to the setting content by the processing of S405.

After the processing of S405, the cache management device 150 restarts using the non-compression LUT cache 180-1 and the compression LUT cache 180-2 (S406). According to this, processing of changing a ratio between the capacity of the non-compression LUT cache 180-1 and the capacity of the compression LUT cache 180-2 ends.

A specific operation for changing the ratio between the capacity of the non-compression LUT cache 180-1 and the capacity of the compression LUT cache 180-2 is not limited to the above description. For example, the cache management device 150 may switch whether to be used as the non-compression LUT cache 180-1 or the compression LUT cache 180-2 in units of tables 170.

Figure 8:
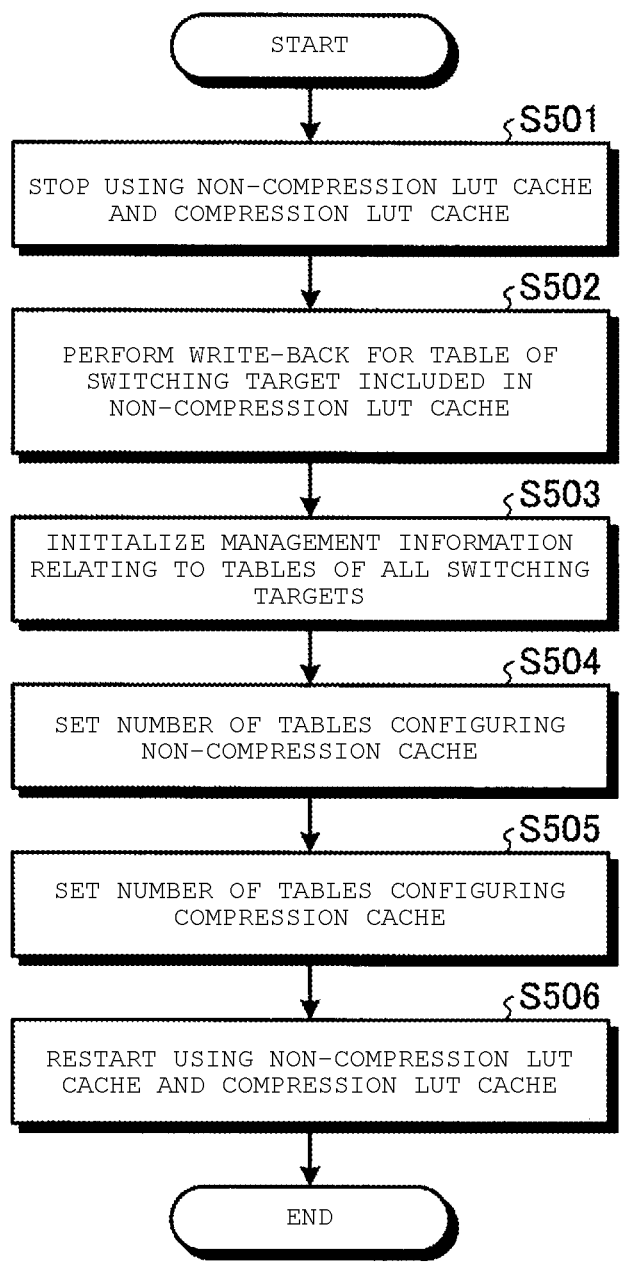
FIG. 8 is another example of the specific operation performed by the memory system according to the first embodiment when changing the ratio between the capacity of the non-compression LUT cache and the capacity of the compression LUT cache.

FIG. 8 is a flowchart illustrating another example of a specific operation performed by the memory system 1 according to the first embodiment when changing the ratio between the capacity of the non-compression LUT cache 180-1 and the capacity of the compression LUT cache 180-2.

First, the cache management device 150 stops using the non-compression LUT cache 180-1 and the compression LUT cache 180-2 (S501).

Subsequently, when the table 170-1 of the non-compression LUT cache 180-1 is switched to the table 170-2 of the compression LUT cache 180-2, write back is performed for all the cache lines 171 in a dirty state among the tables 170-1 to be switched (S502).

Subsequently, the cache management device 150 initializes management information on the table 170 to be switched even in both of (i) a case where the table 170-1 of the non-compression LUT cache 180-1 is switched to the table 170-2 of the compression LUT cache 180-2, and (ii) a case where the table 170-2 of the compression LUT cache 180-2 is switched to the table 170-1 of the non-compression LUT cache 180-1 (S503).

Subsequently, the control device 140 sets the number of tables 170-1 to be configured in the non-compression LUT cache 180-1 (S504). Then, the control device 140 sets the number of tables 170-2 to be configured in the compression LUT cache 180-2 (S505).

After the processing of S505, the cache management device 150 restarts using the non-compression LUT cache 180-1 and the compression LUT cache 180-2 (S506). According to this, the processing of changing the ratio between the capacity of the non-compression LUT cache 180-1 and the capacity of the compression LUT cache 180-2 ends.

As described above, according to the first embodiment, the control device 140 acquires the frequency of sequential writes and controls the ratio between the capacity of the non-compression LUT cache 180-1 and the capacity of the compression LUT cache 180-2 based on the frequency.

Therefore, it is possible to perform a control for increasing a percentage of the capacity of the compression LUT cache 180-2 when it is estimated that a compression rate of the LUT segment 131 is high and for reducing the percentage of the capacity of the compression LUT cache 180-2 when it is estimated that the compression rate of the LUT segment 131 is low. Accordingly, it is possible to increase performance of the memory system 1.

Specifically, the control device 140 increases a ratio of the non-compression LUT cache 180-1 when the frequency of sequential writes is smaller than or equal to the first threshold value, and increases a ratio of the compression LUT cache 180-2 when the frequency of sequential writes is greater than or equal to the second threshold value. The first threshold value is less than the second threshold value.

If the frequency of sequential writes is high, it is estimated that the entropy of the LUT segment 131 is reduced and the compression rate of the LUT segment 131 increases. With the above configuration, it is possible to perform a control for increasing the capacity percentage of the compression LUT cache 180-2 when it is estimated that the compression rate of the LUT segment 131 is high and for reducing the percentage of capacity of the compression LUT cache 180-2 when it is estimated that the compression rate of the LUT segment 131 is low.

When a certain LUT segment 131 is extracted from the non-compression LUT cache 180-1 by the first management device 150-1, the second management device 150-2 can compress the LUT segment 131 by using the compressor 151 and store the compressed LUT segment 131 in the compression LUT cache 180-2.

Further, the first management device 150-1 searches the non-compression LUT cache 180-1 for the LUT segment 131 to be used. When a result of the search by the first management device 150-1 is a cache miss, the second management device 150-2 searches for the LUT segment 131 to be used from the compression LUT cache 180-2.

According to this, when a cache miss occurs in the search from the non-compression LUT cache 180-1 and the LUT segment 131 to be used is stored in the compression LUT cache 180-2, the memory controller 100 can use the LUT segment 131 to be used without requiring an access to the NAND memory 200.

Further, when the search result of the LUT segment 131 to be used from the compression LUT cache 180-2 is a cache hit, the second management device 150-2 acquires the LUT segment 131 to be used in a compressed state from the compression LUT cache 180-2. Then, the second management device 150-2 restores the acquired LUT segment 131 to be used in the compressed state by using the expander 152. The control device 140 uses the LUT segment 131 in the restored state.

In the above description, the LUT segment 131 extracted from the non-compression LUT cache 180-1 is written to the NAND memory 200 and is also written to the compression LUT cache 180-2 when it is successfully compressed to a size smaller than or equal to the second size. The LUT segment 131 extracted from the non-compression LUT cache 180-1 is not written to the NAND memory 200 when it is successfully compressed to a size smaller than or equal to the second size, and may be written to the NAND memory 200 when failing to be compressed to the size smaller than or equal to the second size. In that case, the second management device 150-2 also performs dirty/clean management for the compression LUT cache 180-2.

According to the first embodiment, the ratio between the capacity of the non-compression LUT cache 180-1 and the capacity of the compression LUT cache 180-2 is controlled according to the frequency of sequential writes. Numerical value information used for controlling the ratio is not limited to the frequency of sequential writes.

Second Embodiment

A second embodiment will be described below. In the second embodiment, description on the same point as in the first embodiment will be omitted, and a difference from the first embodiment will be mainly described.

In the second embodiment, the ratio between the capacity of the non-compression LUT cache 180-1 and the capacity of the compression LUT cache 180-2 is controlled based on a cache hit rate when the non-compression LUT cache 180-1 is searched and a cache hit rate when the compression LUT cache 180-2 is searched.

More specifically, when the cache hit rate increases when the non-compression LUT cache 180-1 is searched, it is estimated that the number of cases where the LUT segment 131 can be compressed to a small size is reduced, and thus, a capacity percentage of the non-compression LUT segment 131-1 is increased. When the cache hit rate increases in searching the compression LUT cache 180-2, it is estimated that the number of cases where the LUT segment 131 can be compressed to a small size is increased, and thus, a capacity percentage of the compression LUT segment 131-2 is increased.

Hereinafter, the cache hit rate when the non-compression LUT cache 180-1 is searched is referred to as a cache hit rate related to the non-compression LUT cache 180-1. The cache hit rate when the compression LUT cache 180-2 is searched is referred to as a cache hit rate related to the compression LUT cache 180-2.

Figure 9:
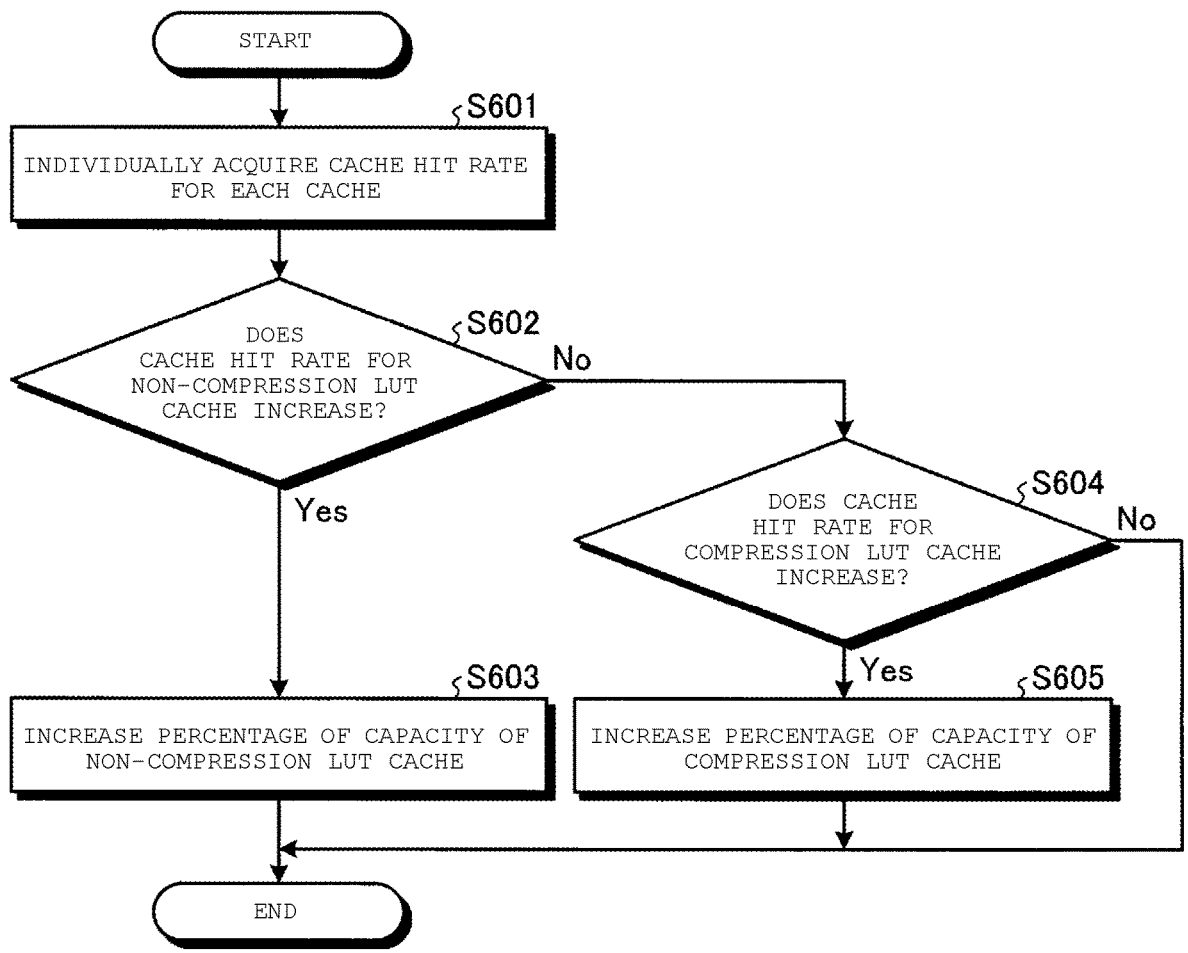
FIG. 9 is a flowchart illustrating an example of an operation executed by a memory system according to a second embodiment, for controlling the ratio between the capacity of the non-compression LUT cache and the capacity of the compression LUT cache.

FIG. 9 is a flowchart illustrating an example of an operation for controlling the ratio between the capacity of the non-compression LUT cache 180-1 and the capacity of the compression LUT cache 180-2, which is performed by the memory system 1 according to the second embodiment. Processing of FIG. 9 is performed, for example, at a predetermined cycle.

In the second embodiment, first, the control device 140 individually acquires a cache hit rate related to the non-compression LUT cache 180-1 and a cache hit rate related to the compression LUT cache 180-2 (S601).

The cache hit rate related to the non-compression LUT cache 180-1 is, for example, a ratio of the number of times that the search result of S101 is a cache hit with respect to the total number of times that search of S101 in FIG. 4 is performed. The cache hit rate related to the compression LUT cache 180-2 is, for example, a ratio of the number of times that the search result of S104 is a cache hit with respect to the total number of times that the search of S104 of FIG. 4 is performed.

After S601, the control device 140 determines whether or not the cache hit rate related to the non-compression LUT cache 180-1 increases (S602). For example, the control device 140 determines whether or not the cache hit rate related to the non-compression LUT cache 180-1 increases as compared with the previously acquired cache hit rate.

When the cache hit rate related to the non-compression LUT cache 180-1 increases (S602: Yes), the control device 140 increases a percentage of the capacity of the non-compression LUT cache 180-1 (S603).

When the cache hit rate related to the non-compression LUT cache 180-1 does not increase (S602: No), the control device 140 determines whether or not the cache hit rate related to the compression LUT cache 180-2 increases (S604). For example, the control device 140 determines whether or not the cache hit rate for the compression LUT cache 180-2 increases as compared with the previously acquired cache hit rate.

When the cache hit rate related to the compression LUT cache 180-2 increases (S604: Yes), the control device 140 increases the percentage of the capacity of the compression LUT cache 180-2 (S605).

When the cache hit rate related to the compression LUT cache 180-2 does not increase (S604: No), or after the processing of S603 or after the processing of S605, an operation for controlling the ratio between the capacity of the non-compression LUT cache 180-1 and the capacity of the compression LUT cache 180-2 ends.

As described above, according to the second embodiment, the control device 140 controls the ratio between the capacity of the non-compression LUT cache 180-1 and the capacity of the compression LUT cache 180-2 based on the cache hit rate related to the non-compression LUT cache 180-1 and the cache hit rate related to the compression LUT cache 180-2.

Thus, when it is estimated that the number of cases where the LUT segment 131 can be compressed to a small size is increased, a capacity percentage of the compression LUT segment 131-2 is increased, and when it is estimated that the number of cases where the LUT segment 131 can be compressed to a small size is reduced, a capacity percentage of the compression LUT segment 131-2 is reduced. According to this, performance of the memory system 1 can be increased.

Specifically, the control device 140 increases a percentage of the capacity of the non-compression LUT cache 180-1 according to an increase in the cache hit rate related to the non-compression LUT cache 180-1, and increases a percentage of the capacity of the compression LUT cache 180-2 according to an increase in the cache hit rate related to the compression LUT cache 180-2.

Third Embodiment

In a third embodiment, a ratio between the capacity of the non-compression LUT cache 180-1 and the capacity of the compression LUT cache 180-2 is controlled based on a ratio of successful compression of the LUT segment 131 to a size smaller than or equal to the second size, for example, in S205 of FIG. 5. This ratio is referred to as a compression success rate.

Specifically, when the compression success rate increases, it is estimated that the number of cases where the LUT segment 131 can be compressed to a small size is increased, and thus, the capacity percentage of the compression LUT segment 131-2 is increased. When the compression success rate decreases, it is estimated that the number of cases where the LUT segment 131 can be compressed to a small size is reduced, and thus, the capacity percentage of the non-compression LUT segment 131-1 is increased.

Figure 10:
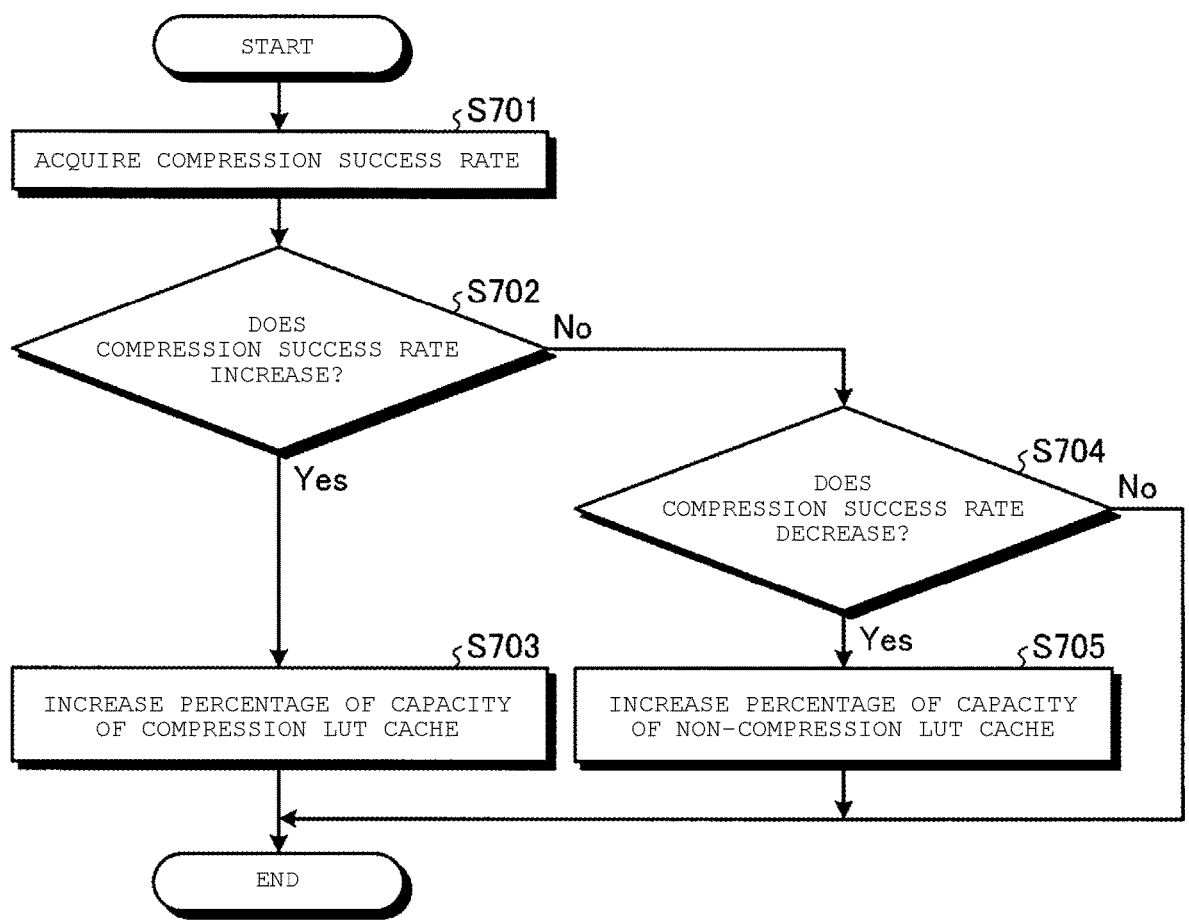
FIG. 10 is a flowchart illustrating an example of an operation executed by a memory system according to a third embodiment, for controlling the ratio between the capacity of the non-compression LUT cache and the capacity of the compression LUT cache.

FIG. 10 is a flowchart illustrating an example of an operation for controlling the ratio between the capacity of the non-compression LUT cache 180-1 and the capacity of the compression LUT cache 180-2, which is performed by the memory system 1 according to the third embodiment. Processing of FIG. 10 is performed, for example, at a predetermined cycle.

First, the control device 140 acquires the compression success rate (S701). The compression success rate is, for example, a ratio of the number of times that a size of the compressed LUT segment 131 is smaller than or equal to the second size with respect to the total number of times that the processing of S205 is performed.

After S701, the control device 140 determines whether or not the compression success rate is increased (S702). For example, the control device 140 determines whether or not the compression success rate is increased as compared with the previous acquired compression success rate.

When the compression success rate increases (S702: Yes), the control device 140 increases a percentage of the capacity of the compression LUT cache 180-2 (S703).

When the compression success rate does not increase (S702: No), it is determined whether or not the compression success rate decreases (S704). When the compression success rate decreases (S704: Yes), the control device 140 increases the percentage of the capacity of the non-compression LUT cache 180-1 (S705).

When the compression success rate does not decrease (S704: No), or after the processing of S703 or after the processing of S705, the operation for controlling the ratio between the capacity of the non-compression LUT cache 180-1 and the capacity of the compression LUT cache 180-2 ends.

As described above, according to the third embodiment, the ratio between the capacity of the non-compression LUT cache 180-1 and the capacity of the compression LUT cache 180-2 is controlled based on a success rate of processing of compressing the LUT segment 131 to a size smaller than or equal to the second size.

Therefore, when it is estimated that the number of cases where the LUT segment 131 can be compressed to a small size is increased, the capacity percentage of the compression LUT segment 131-2 is increased, and when it is estimated that the number of cases where the LUT segment 131 can be compressed to a small size is reduced, the capacity percentage of the compression LUT segment 131-2 is reduced. According to this, performance of the memory system 1 can be increased.

Specifically, the control device 140 increases the percentage of the capacity of the compression LUT cache 180-2 according to an increase in the success rate of the processing of compressing the LUT segment 131 to a size smaller than or equal to the second size, and increases the percentage of the capacity of the non-compression LUT cache 180-1 according to a decrease in the success rate.

As described in the first to third embodiments, according to the embodiment, the control device 140 acquires predetermined numerical value information, and controls the ratio between the capacity of the non-compression LUT cache 180-1 and the capacity of the compression LUT cache 180-2 based on the numerical value information. According to the example of the first embodiment, the numerical value information is the frequency of sequential writes. According to the example of the second embodiment, the numerical value information is the cache hit rate related to the non-compression LUT cache 180-1 and the cache hit rate related to the compression LUT cache 180-2. According to the example of the third embodiment, the numerical value information is a success rate of processing of compressing the LUT segment 131 to a size smaller than or equal to the second size.

The control device 140 may receive information indicating whether or not the host 2 performs s sequential access from the host 2. The control device 140 may control a ratio between the capacity of the non-compression LUT cache 180-1 and the capacity of the compression LUT cache 180-2 based on the information.

Further, in the related art, a multi-stream function is proposed as a function of a memory system. If a write command including a stream identifier (hereinafter referred to as a stream ID) is received, the memory system having the multi-stream function writes data (hereinafter referred to as write data) requested to be written by the write command to a block in accordance with the stream ID. Here, when a stream is newly generated (opened), it can be estimated that the frequency of sequential accesses increases. If it is detected that a new stream is opened, the control device 140 may control a ratio between a capacity of the non-compression LUT cache 180-1 and a capacity of the compression LUT cache 180-2. That is, the control device 140 may increase the capacity of the compression LUT cache 180-2 according to an opening of a new stream.

With the memory system 1 configured as described above, when it is estimated that the number of cases where the LUT segment 131 can be compressed to a small size is increased, a capacity percentage of the compression LUT segment 131-2 is increased, and when it is estimated that the number of cases where the LUT segment 131 can be compressed to a small size is reduced, the capacity percentage of the compression LUT segment 131-2 is reduced. According to this, performance of the memory system 1 can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile first memory;
a second memory in which a plurality of look-up table segments are stored, each of the look-up table segments containing information that correlates logical addresses indicating locations in a logical address space of the memory system with physical addresses indicating locations in the first memory;
a volatile third memory including a first cache and a second cache;
a compressor configured to perform compression on look-up table segments supplied thereto; and
a memory controller configured to:
store first look-up table segments in the first cache and second look-up table segments in the second cache,
determine a frequency of sequential writes based on a plurality of write commands from the host, and
automatically adjust a ratio between a first capacity, which is a capacity of the first cache, and a second capacity, which is a capacity of the second cache, according to the frequency of sequential writes,
wherein the first look-up table segments in the first cache are stored in non-compressed form, and the second look-up table segments in the second cache are supplied to and compressed by the compressor before being stored in the second cache, and
wherein the memory controller increases the first capacity when the frequency of sequential writes is smaller than or equal to a first value and increases the second capacity when the frequency of sequential writes is greater than or equal to a second value, the first value being less than the second value.

2. The memory system according to claim 1, wherein the memory controller is further configured to:
determine a first cache hit rate, which is a cache hit rate of the first cache, and a second cache hit rate, which is a cache hit rate of the second cache and
adjust the ratio according to the first cache hit rate or the second cache hit rate.

3. The memory system according to claim 2,
wherein the memory controller increases the first capacity according to an increase in the first cache hit rate, and increases the second capacity according to an increase in the second cache hit rate when the first cache hit rate does not increase.

4. The memory system according to claim 1, wherein the memory controller is further configured to:
determine a success rate of compressing the second look-up table segments to a predetermined size or less and
adjust the ratio according to the success rate.

5. The memory system according to claim 4,
wherein the memory controller increases the second capacity according to an increase in the success rate and increases the first capacity according to a decrease in the success rate.

6. The memory system according to claim 1,
wherein when a first look-up table segment is extracted from the first cache, the memory controller compresses the first look-up table segment extracted from the first cache using the compressor and stores the compressed first look-up table segment in the second cache.

7. The memory system according to claim 1,
wherein the memory controller performs a first search for a first logical address in the first cache, and then a second search for the first logical address in the second cache when the first search fails.

8. The memory system according to claim 7, further comprising:
an expander,
wherein when the second search succeeds, the memory controller retrieves a second look-up table segment from the second cache, restores the retrieved second look-up table segment using the expander, and performs an operation using the restored second look-up table segment.

9. A method of dynamically sizing first and second caches of a volatile memory, wherein the first cache stores segments of address conversion information in non-compressed form and the second cache stores segments of the address conversion information in compressed form, said method comprising:
determining a frequency of sequential writes based on a plurality of write commands from a host; and
automatically adjusting, by a memory controller that controls the volatile memory, a ratio between a first capacity, which is a capacity of the first cache, and a second capacity, which is a capacity of the second cache, according to the frequency of sequential writes, wherein the memory controller increases the first capacity when the frequency of sequential writes is smaller than or equal to a first value and increases the second capacity when the frequency of sequential writes is greater than or equal to a second value, the first value being less than the second value.

10. The method according to claim 9, further comprising:
determining a first cache hit rate, which is a cache hit rate of the first cache, and a second cache hit rate, which is a cache hit rate of the second cache; and
adjusting the ratio according to the first cache hit rate or the second cache hit rate.

11. The method according to claim 10, further comprising:
increasing the first capacity according to an increase in the first cache hit rate, and increasing the second capacity according to an increase in the second cache hit rate when the first cache hit rate does not increase.

12. The method according to claim 9, further comprising:
determining a success rate of compressing segments of the address conversion information to a predetermined size or less; and
adjusting the ratio according to the success rate.

13. The method according to claim 12, further comprising:
increasing the second capacity according to an increase in the success rate and increasing the first capacity according to a decrease in the success rate.

14. The method according to claim 9, further comprising:
when a segment of the address conversion information is extracted from the first cache, compressing the segment of the address conversion information extracted from the first cache and storing the extracted and compressed segment of the address conversion information in the second cache.

15. The method according to claim 9, further comprising:
performing a first search for a first logical address in the first cache, and then a second search for the first logical address in the second cache when the first search fails.

16. The method according to claim 15, further comprising:
when the second search succeeds, retrieving a segment of the address conversion information from the second cache, restoring the retrieved segment of the address conversion information, and performing an operation using the restored segment of the address conversion information.

* * * * *